United States Patent [19]
Domany et al.

[11] Patent Number: 6,021,383
[45] Date of Patent: Feb. 1, 2000

[54] METHOD AND APPARATUS FOR CLUSTERING DATA

[75] Inventors: Eytan Domany; Marcelo Blatt; Shai Wiseman, all of Rehovot, Israel

[73] Assignee: Yeda Research & Development Co., Ltd., Israel

[21] Appl. No.: 08/725,960

[22] Filed: Oct. 7, 1996

[51] Int. Cl.[7] .................................................. G06F 17/00
[52] U.S. Cl. ..................... 702/181; 702/182; 395/553; 382/225
[58] Field of Search ..................................... 364/554, 580, 364/551.01, 489, 490, 578; 382/225, 181, 228; 395/119, 127, 611–613, 21–24, 742, 553; 324/307, 309; 702/181, 182

[56] References Cited

U.S. PATENT DOCUMENTS

| | | | |
|---|---|---|---|
| 5,185,813 | 2/1993 | Tsujimato | 382/180 |
| 5,517,602 | 5/1996 | Natarajan | 395/119 |

OTHER PUBLICATIONS

Blatt et al "Clustering data through an analogy to the Potts model"; Advances in Neural Information Processing 8th Proceedings of the 1995 Conference, p. 416–22, Nov. 27, 1995.

Blatt et al "Superparamagnetic clusting of data"; Physical Review Letters vol. 76, No. 18 p. 3251–4, Apr. 29, 1996.

*Primary Examiner*—Kamini Shah
*Attorney, Agent, or Firm*—Evenson, McKeown, Edwards & Lenahan, P.L.L.C.

[57] ABSTRACT

A method and apparatus for partitioning a data set for clustering, based on the physical properties of an inhomogeneous ferromagnet. No assumption is made regarding the underlying distribution of the data. A Potts spin is assigned to each data point and an interaction between neighboring points is introduced, whose strength is a decreasing function of the distance between the neighbors. This magnetic system exhibits three phases. At very low temperatures it is completely ordered; i.e. all spins are aligned. At very high temperatures the system does not exhibit any ordering and in an intermediate regime clusters of relatively strongly coupled spins become ordered, whereas different clusters remain uncorrelated. This intermediate phase is identified by a jump in the order parameters. The spin—spin correlation function is used to partition the spins and the corresponding data points into clusters.

16 Claims, 9 Drawing Sheets

METHOD AND APPARATUS FOR CLUSTERING DATA

FIELD OF INVENTION

The present invention relates to a method and apparatus for determining or gathering information in the form of a data set, in which the distribution of the data set is not known or available, and for processing uniquely the data set to find a partition of the data set in to several groups, each group indicating the presence of a distinct category of the determined or gathered information.

BACKGROUND OF INVENTION

Clustering is an important known technique in exploratory data analysis, where a priori knowledge of the distribution of the observed data is not available. Known prior art Partitional clustering methods, that divide the data according to natural classes present in it, have been used in a large variety of scientific disciplines and engineering applications that include pattern recognition, learning theory, astrophysics, medical image and data processing, image compression, satellite data analysis, automatic target recognition, as well as, speech and text recognition, and other types of data analysis.

The goal in collecting and processing data is to find a partition of a given data set into several groups. Each group indicates the presence of a distinct category in the data. The problem of partitional clustering is usually formally stated as follows. Determine the partition of N given patterns $\{v_i\}_{i=1}^{N}$ into groups, called clusters, such that the patterns of a cluster are more similar to each other than to patterns in different clusters. It is assumed that either $d_{ij}$, the measure of dissimilarity between patterns $v_i$ and $v_j$ is provided, or that each pattern $v_i$ is represented by a point $\vec{x}_i$ in a D-dimensional metric space, in which case $d_{ij} = |\vec{x}_i - \vec{x}_j|$.

The two main approaches to partitional clustering are called parametric and non-parametric. In parametric approaches some knowledge of the clusters' structure is assumed, and, in most cases, patterns can be represented by points in a D-dimensional metric space. For instance, each cluster can be parameterized by a center around which the points that belong to it are spread with a locally Gaussian distribution. In many cases the assumptions are incorporated in a global criterion whose minimization yields the "optimal" partition of the data. The goal is to assign the data points so that the criterion is minimized. Classical prior art approaches or techniques are variance minimization, maximal likelihood and fitting Gaussian mixtures. A nice example of variance minimization is the method based on principles of statistical physics, which ensures an optimal solution under certain conditions. This method has given rise to other mean-field methods for clustering data. Classical examples of fitting Gaussian mixtures are the Isodata algorithm or its sequential relative, the K-means algorithm in statistics, and soft competition in neural networks.

In many cases of interest, however, there is no a priori knowledge about the data structure. Then, one usually adopts non-parametric approaches, which make less assumptions about the model, and, therefore, are suitable to handle a wider variety of clustering problems. Usually these methods employ a local criterion, against which some attribute of the local structure of the data is tested, to construct the clusters. Typical examples are hierarchical techniques such as agglomerative and divisive methods. These algorithms suffer, however, from at least one of the following limitations: (a) high sensitivity to initialization; (b) poor performance when the data contains overlapping clusters; (c) inability to handle variabilities in cluster shapes, cluster densities and cluster sizes. The most serious problem is the lack of cluster validity criteria; in particular, none of these methods provides an index that could be used to determine the most significant partitions among those obtained in the entire hierarchy. All of the algorithms used in these techniques tend to create clusters even when no natural clusters exist in the data.

SUMMARY OF THE INVENTION

The object and advantage of the present invention is to provide a new method and apparatus for determining or gathering information in the scientific disciplines and engineering applications listed above and in others not specifically named, but which are related in kind, and for processing uniquely the information (which is in the form of a data set) to find a partition in the data set in a more effective and more successful manner than has heretofore been possible by the prior art approaches and techniques mentioned above. Other objects and advantages will become evident from the following detailed description of the preferred embodiment of the invention.

The objects and advantages of the invention are accomplished mainly by providing a new approach to clustering, based on the physical properties of a magnetic system. The method of this invention has a number of rather unique advantages: it provides information about the different self organizing regimes of the data; the number of "macroscopic" clusters is an output of the algorithm employed in the novel method of the present invention; hierarchical organization of the data is reflected in the manner the clusters merge or split when a control parameter (the temperature of the associated magnetic model) is varied. Moreover, the results are completely insensitive to the initial conditions, and the algorithm employed in the present invention is robust against the presence of noise. The algorithm is computationally efficient; equilibration time of the spin system scales with N, the number of data points, and is independent of the embedding dimension D. As will be demonstrated in the following description, the algorithm employed in the method and apparatus of the present invention works with high efficiency and performance on various real-life problems.

DESCRIPTION OF THE DRAWINGS

Referring now to the drawings.

Figure 2:
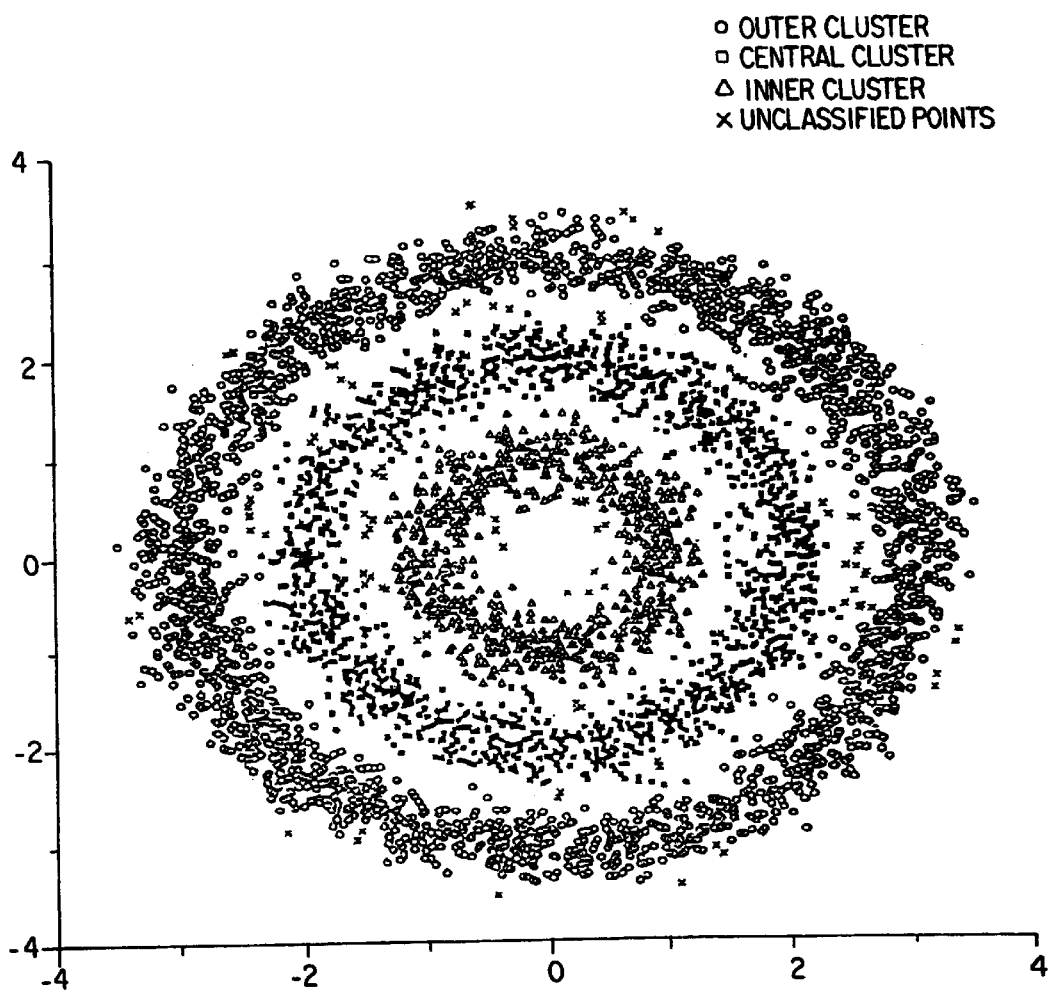
FIG. 2 is a data distribution of example 1.

of data set of FIG. 2.

Figure 3A:
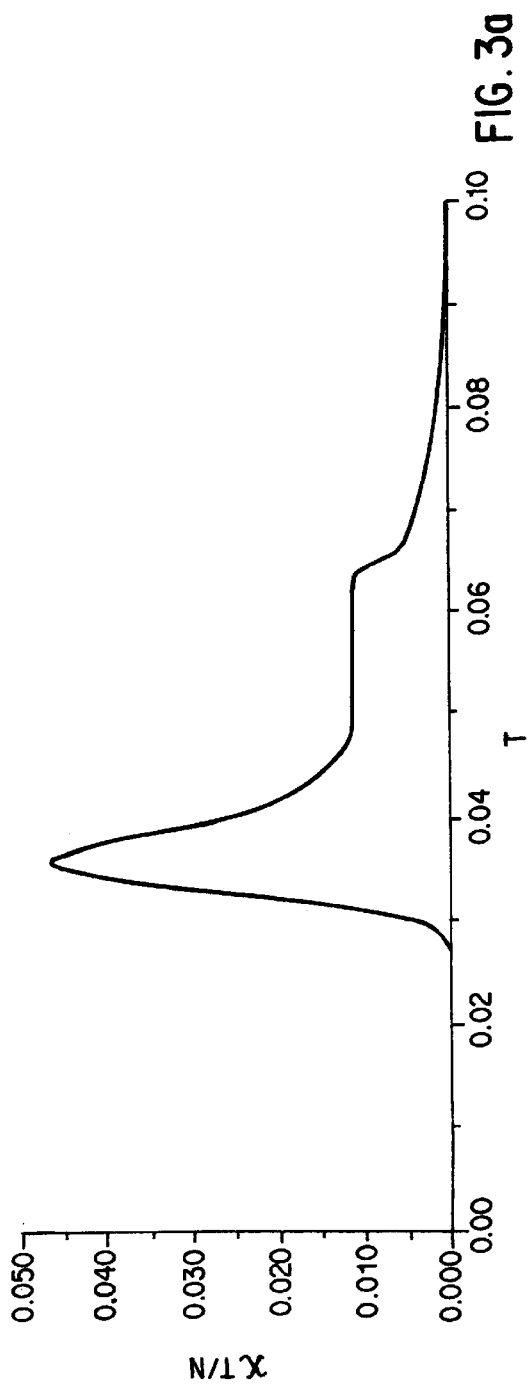
FIG. 3(a) is a graph of susceptibility density $$\frac{\chi T}{N} \text{ v. } T$$
Figure 3B:
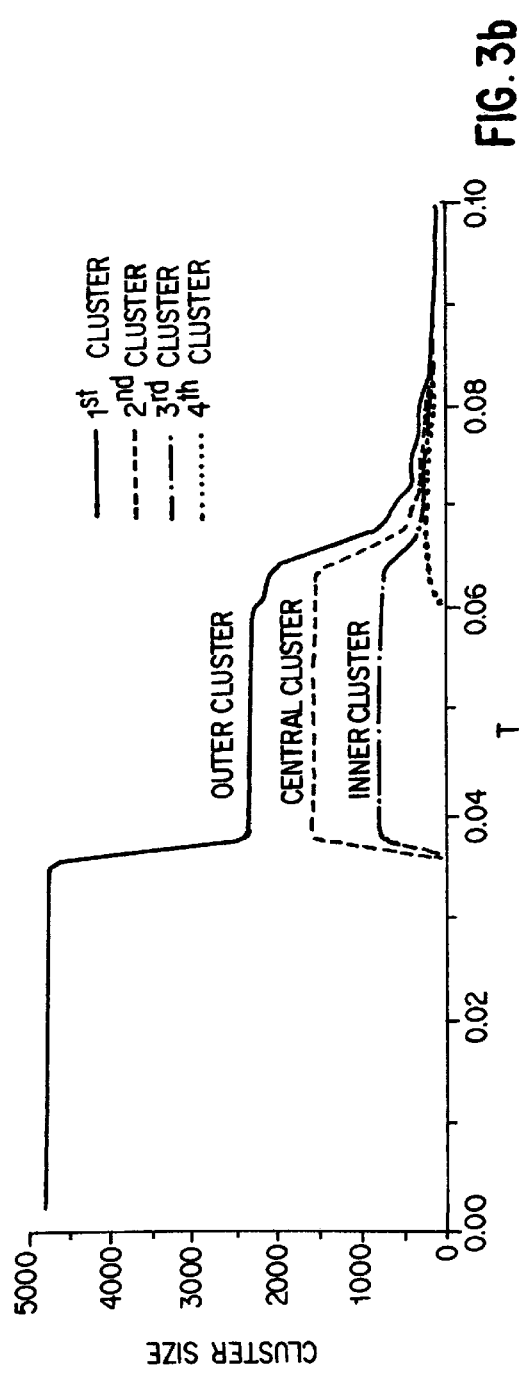

FIG. 3(b) is a graph of cluster size v. T of data set of FIG. 2.

Figure 4:
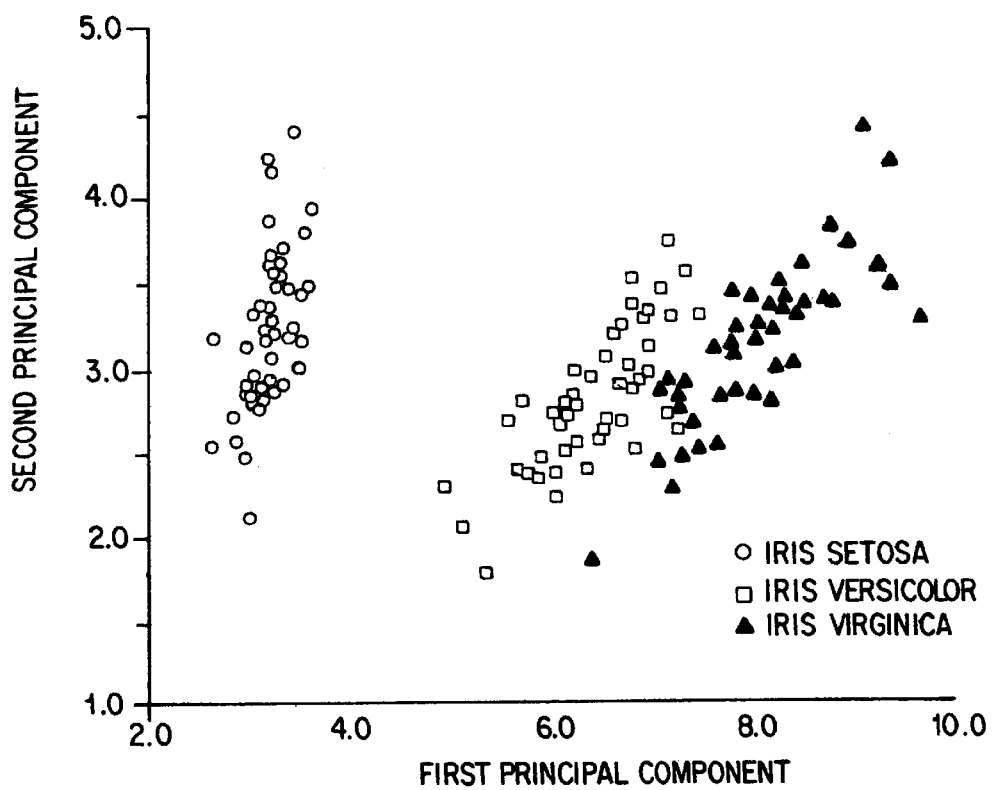
Figure 5A:
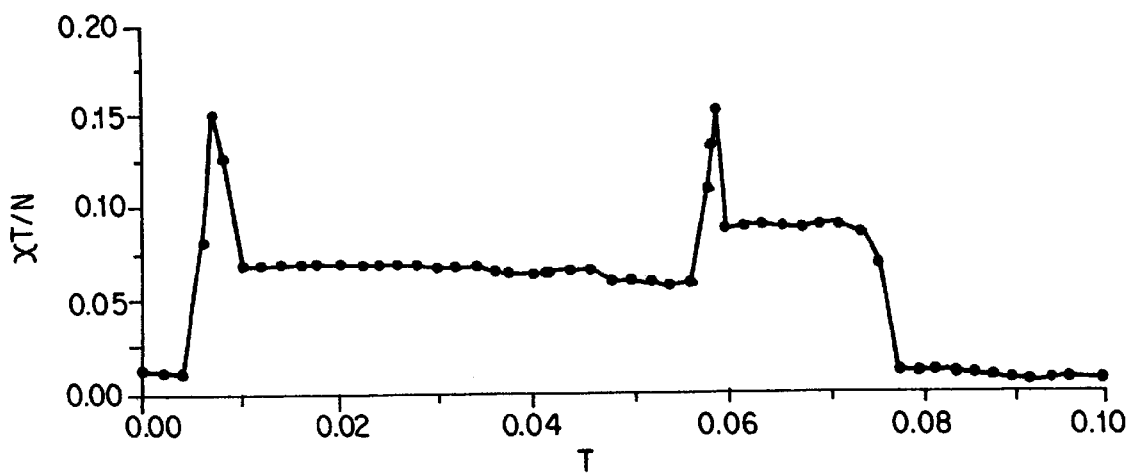
Figure 5B:
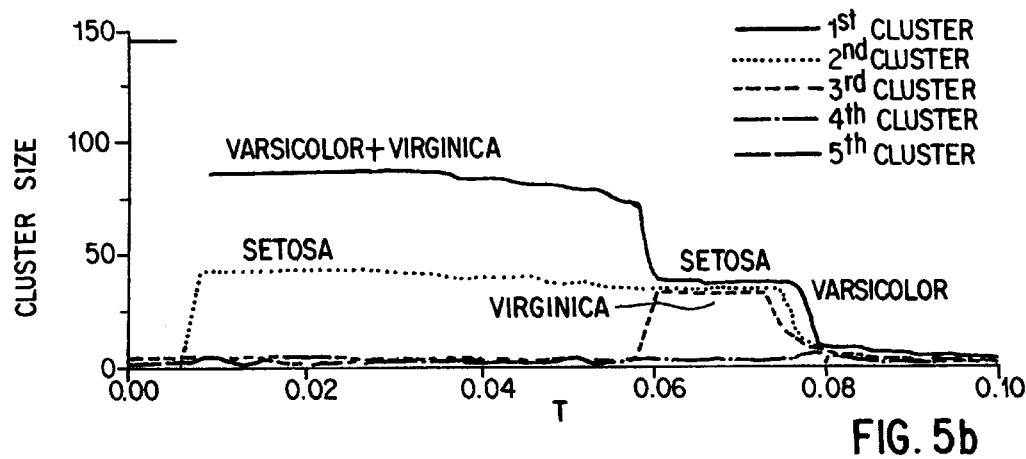
Figure 6A:
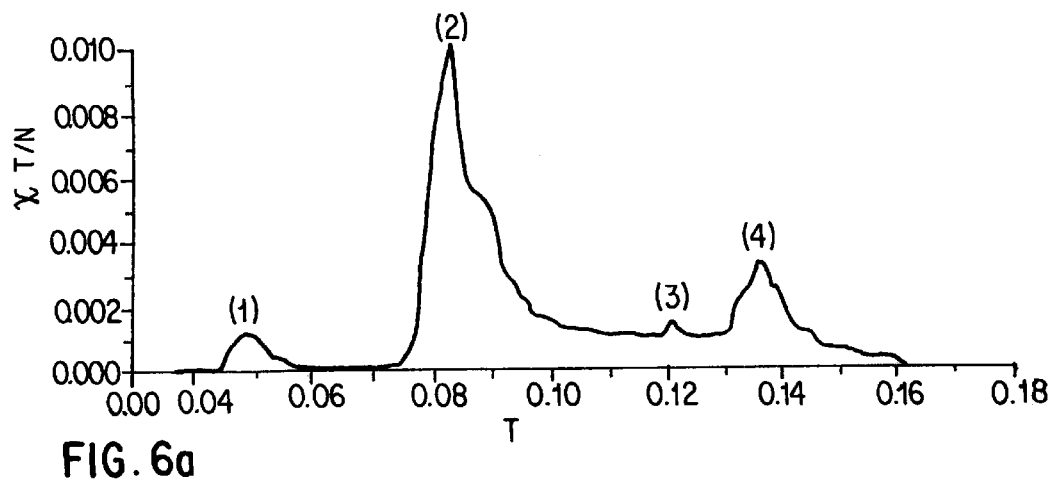
Figure 6B:
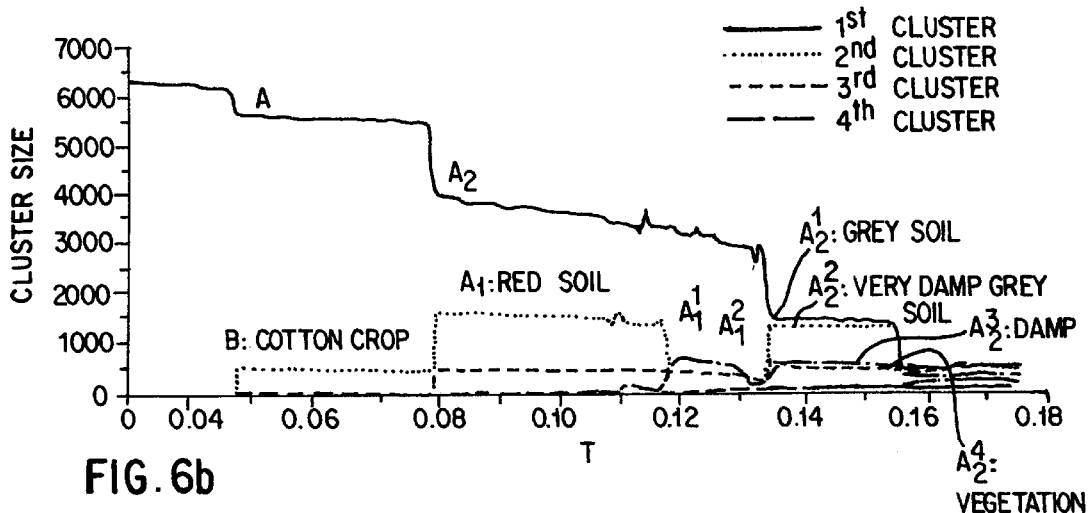

FIG. 4 is a projection of iris data of example 3.
FIG. 5(a) is a graph like FIG. 3(a) but for example 3.
FIG. 5(b) is a graph like FIG. 3(b) but for example 3.
FIG. 6(a) is a graph like FIG. 3(a) but for example 4.
FIG. 6(b) is a graph like FIG. 3(b) but for example 4.

Figure 7:
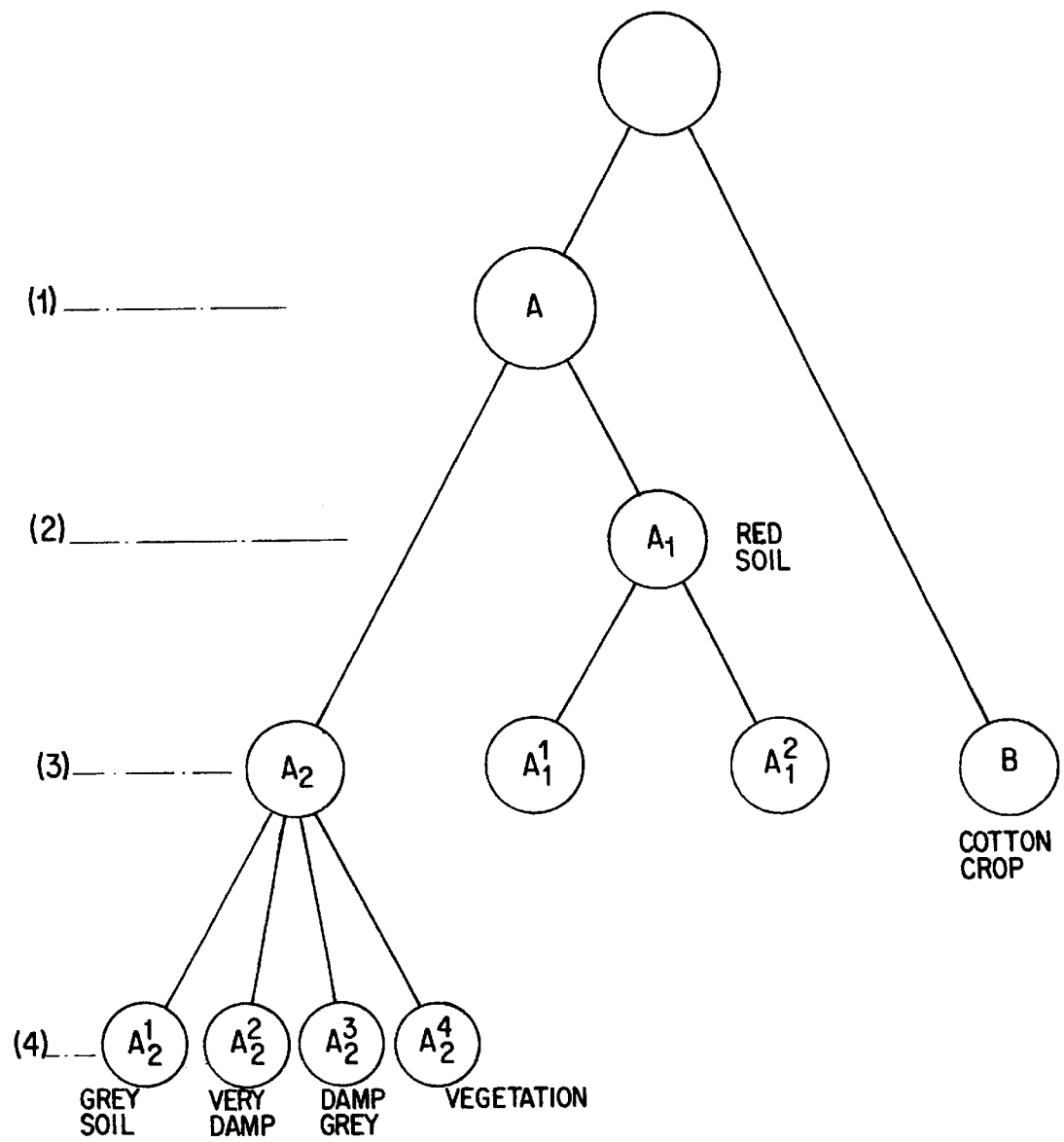

FIG. 7 is a schematic of hierarchical structure of landsat data set.

Figure 8A:
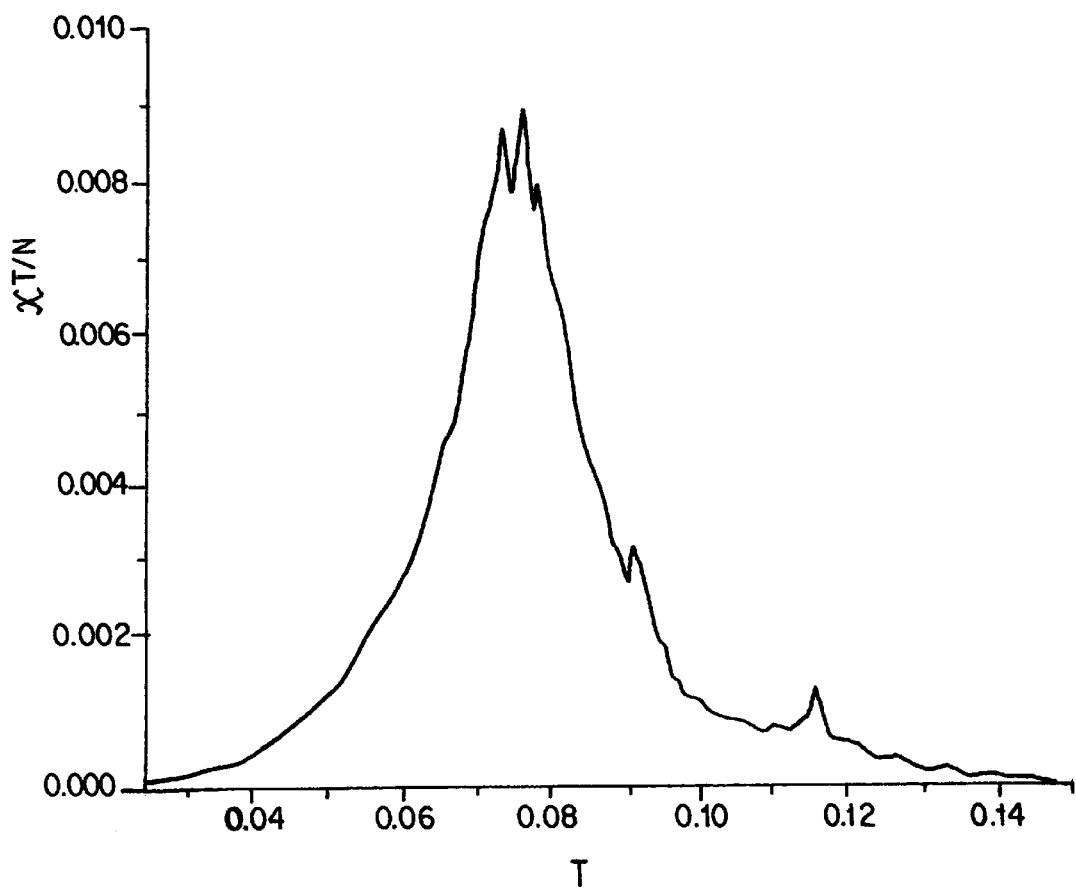

FIG. 8(a) is a graph like FIG. 3(a) but for example 5.

Figure 8B:
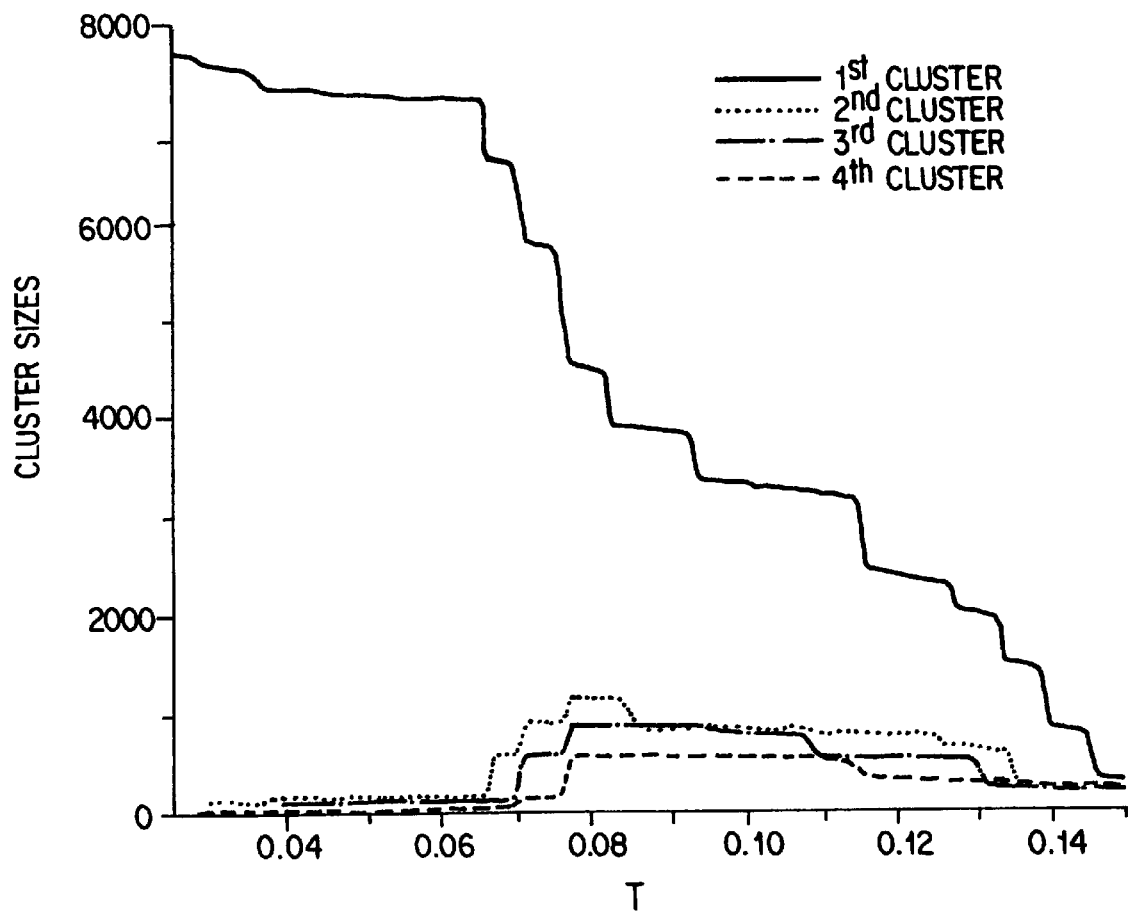

FIG. 8(b) is a graph like FIG. 3(b) but for example 5.

Figure 9:
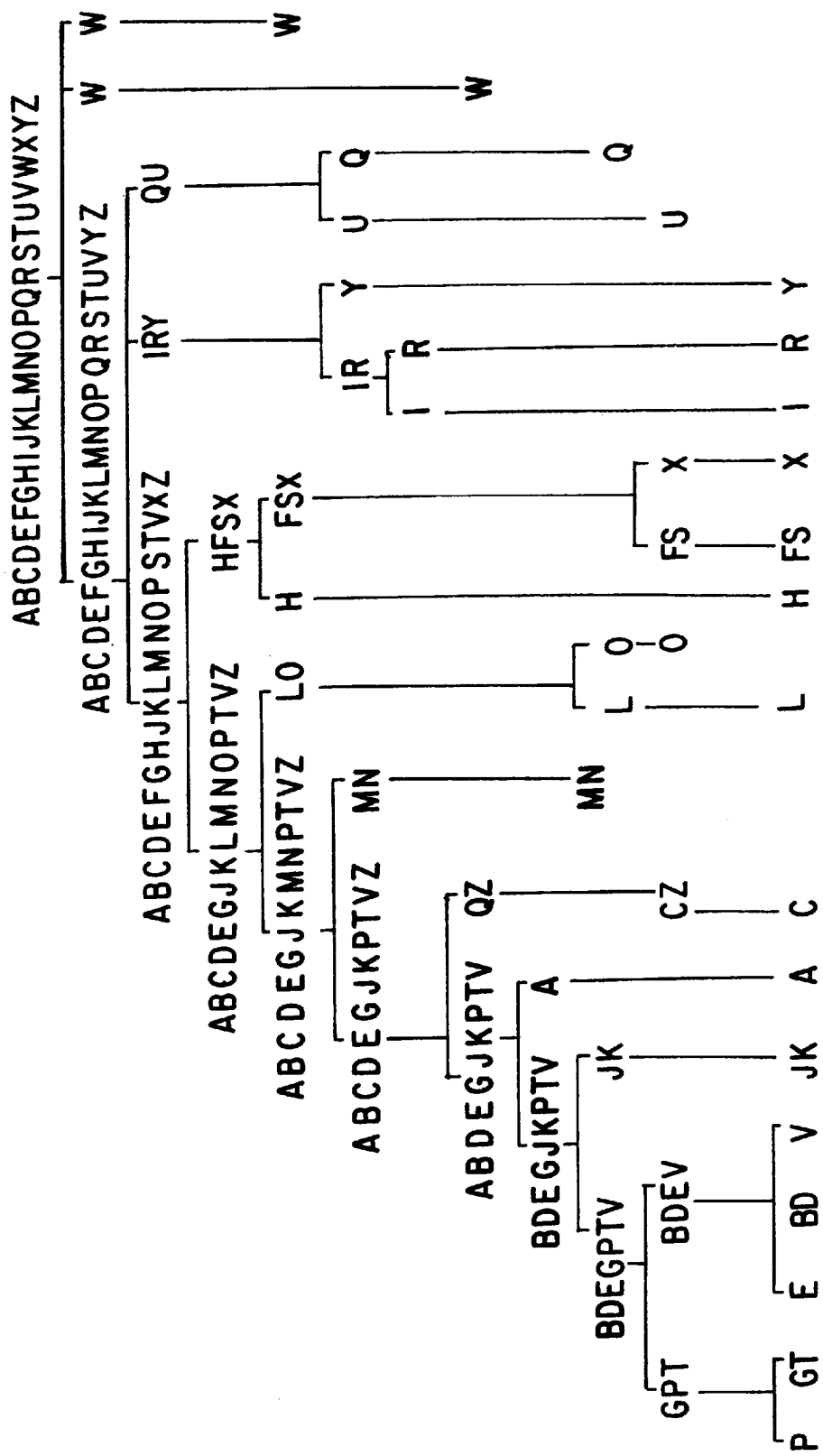

FIG. 9 is a schematic of the hierarchy of the isolated speech-recognition data set.

DETAILED DESCRIPTION OF INVENTION

Figure 1:
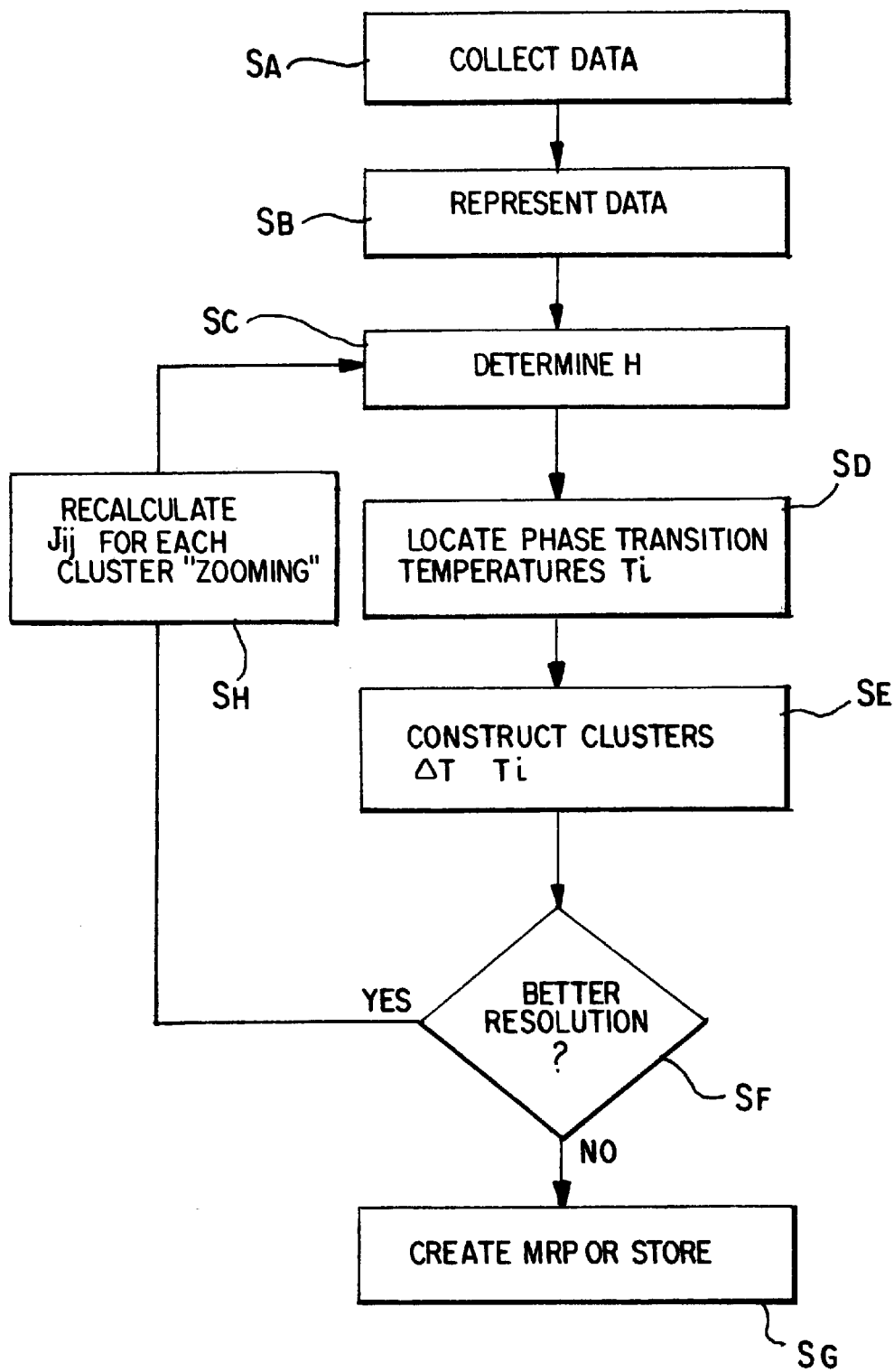
FIG. 1 is a flow diagram representationally showing the steps of the method of the present invention and the inventive apparatus.

The method and apparatus of the present invention will now be described in detail with respect to a preferred embodiment and with reference to the drawings. Referring to FIG. 1 which shows a flow diagram the first step $S_A$ is the collection or gathering of information in the form of a data set. The particular activity ongoing may be or concern any scientific discipline or engineering application such as, but not limited to, pattern recognition, time series prediction, learning theory, astrophysics, medical applications including imaging and data processing, network partitioning, image compression, satellite data gathering, data bases (management and mining), and analysis, automatic target recognition and speech and text recognition. As noted above other types of data generation, determining, gathering, sensing, or measuring applications which result in a data set to be processed are intended to be included within the purview of the present invention. Also, since the particular means or apparatus to generate, determine, gather, etc. is well known in the art to those of ordinary skill, an elaboration of same is not deemed necessary and would be a redundancy. For the purpose of the present description, satellite scanning will be used as an example for step $S_A$. Multi-spectral scanners on LANDSAT satellites sense the electromagnetic energy of the light reflected by the earth's surface in several bands (or wavelengths) of the spectrum. A pixel represents the smallest area on earth's surface that can be separated from the neighboring areas. The pixel size and the number of bands varies, depending on the scanner. In a particular case, four bands were utilized, and the pixel resolution was 80×80 meters. Two of the wavelengths were in the visible region, corresponding approximately to green (0.52 to 0.60 $\mu_m$) and red (0.63 to 0.69 $\mu_m$) and the other two were in the near-infrared (0.76 to 0.90 $\mu_m$) and mid-infrared (1.55 to 1.75 $\mu_m$) regions. The wavelength interval associated with each band is tuned to a particular cover category. For example the green band is useful for identifying areas of shallow water, such as shoals and reefs, whereas the red band emphasizes urban areas.

The particular data in the example consist of 6437 samples that are contained in a rectangle of 82×100 pixels. Each "data point" is described by 36 features that correspond to a 3×3 square of pixels. A classification label (ground truth) of the central pixel is also provided. The data is given in random order and certain samples were removed, so that one cannot reconstruct the original image. The data set is available at the UCI Machine Learning Repository.

For the particular case, the goal was to find the "natural classes" present in the data (without using its labels, of course). The quality of the results is determined by the extent to which the clustering reflects the six terrain classes present in the data: red soil, cotton crop, grey soil, damp grey soil, soil with vegetation stubble and very damp grey soil. This example or exercise is close to a real problem of remote sensing, where the true labels (ground truth) on the pixels is not available, and, therefore, clustering techniques are needed to group pixels on the basis of the sensed observations.

The output of step $S_A$ is the input to second step $S_B$. The second step $S_B$ of the method of the present invention is to represent the data set in a form that it can be effectively processed in subsequent steps of the method. In general, this step is well known in the art and several prior art methods are available to those skilled in the art by which representation can be performed or carried out. The selection of an appropriate method for a particular case would be easily accomplished by persons skilled in the art.

For example, referring to the LANDSAT case set out in step $S_A$, the data is represented as follows in step $S_B$. Each data point $\underline{x}_i$ consists of a 3×3 square of pixels where for each pixel the amplitudes of the 4 bands are given. Thus $\underline{x}_i$ is a 36=9×4 dimensional vector. The distance between any 2 data points $\underline{x}_i$, $\underline{x}_j$ is some measure of dissimilarity $d_{ij}$.

The output of step $S_B$ is the input to third step $S_C$. The third step $S_C$ of the method of the present invention is to determine the Hamiltonian $\mathcal{H}(S)$.

The present invention makes use of the physics of Potts models and modifies the models with various concepts and thermodynamic functions to enable effective processing of the clustering problem. Ferromagnetic Potts models have been extensively studied for many years, primarily, but not exclusively, as models for magnetic materials. The basic spin variable s can take one of q integer values: s=1, 2, ... q. The Potts spins are located at points $v_i$ that reside on (or off) the sites of some lattice. Pairs of spins associated with points i and j are coupled by an interaction of strength $J_{ij}$>0. Denote by S a configuration of the system, $S=\{s_i\}_{i=1}^N$. The energy of such a configuration is given by the Hamiltonian $$\mathcal{H}(s) = \sum_{<i,j>} J_{ij}(1 - \delta_{s_i,s_j}) \quad s_i = 1, ...q, \tag{1}$$

where the notation <i,j> stands for neighboring sites $v_i$ and $v_j$. The contribution of a pair <i,j> to $\mathcal{H}$ is $-J_{ij}$ when $s_i=s_j$, when the two spins are aligned. If one chooses interactions that are a decreasing function of the distance $d_{ij} \equiv d(v_i,v_j)$, then the closer two points are to each other, the more they "like" to be in the same state. The Hamiltonian (1) is very similar to other energy functions used in neural systems, where each spin variable represents a q-state neuron with an excitatory coupling to its neighbors. In fact, magnetic models have inspired many neural models.

In order to calculate the thermodynamic average of a physical quantity A at a fixed temperature T, one has to calculate the sum $$\langle A \rangle = \sum_s A(s)P(s), \tag{2}$$

where the Boltzmann factor $$P(s) = \frac{1}{Z}\exp\left(-\frac{\mathcal{H}(s)}{T}\right), \tag{3}$$

plays the role of the probability density which gives the statistical weight of each spin configuration $S=\{s_i\}_{i=1}^N$ in thermal equilibrium and Z is a normalization constant, $Z=\Sigma_s \exp(-\mathcal{H}(S)/T)$.

Some of the most important physical quantities A for this magnetic system are the order parameter or magnetization and the set of $\delta_{s_i,s_j}$ functions, because their thermal average reflect the ordering properties of the model.

The order parameter of the system is (m), where the magnetization, m(S), associated with a spin configuration S is defined as $$m(s) = \frac{qN_{\max}(s) - N}{(q-1)N} \quad (4)$$

with $$N_{\max}(s) = \max\{N_1(s), N_2(s), \ldots N_q(s)\},$$

$N_\mu(S)$ is the number of spins with the value $\mu$; $N_\mu(S) = \Sigma_i \delta_{s_i,\mu}$.

The thermal average of $\delta_{s_i,s_j}$ is called the spin—spin correlation function, $$G_{ij} = \langle \delta_{s_i,s_j} \rangle, \quad (5)$$

which is the probability of the two spins $s_i$ and $s_j$ being aligned.

When the spins are on a lattice and all nearest neighbor couplings are equal, $J_{ij}=J$, the Potts system is homogeneous. Such a model exhibits two phases. At high temperatures the system is paramagnetic or disordered; (m)=0, indicating that $$N_{\max}(s) \approx \frac{N}{q}$$

for all statistically significant configurations. In this phase the correlation function $G_{ij}$ decays to $$\frac{1}{q}$$

when the distance between points $v_i$ and $v_j$ is large; this is the probability to find two completely independent Potts spins in the same state. At very high temperatures even neighboring sites have $$G_{ij} \approx \frac{1}{q}.$$

As the temperature is lowered, the system undergoes a sharp transition to an ordered, ferromagnetic phase; the magnetization jumps to (m)≠0. This means that in the physically relevant configurations (at low temperatures) one Potts state "dominates" and $N_{max}(S)$ exceeds $$\frac{N}{q}$$

by a macroscopic number of sites. At very low temperatures (m)≈1 and $G_{ij}$≈1 for all pairs $\{v_i, v_j\}$.

The variance of the magnetization is related to a relevant thermal quantity, the susceptibility, $$\chi = \frac{N}{T}(\langle m^2 \rangle - \langle m \rangle^2), \quad (6)$$

which also reflects the thermodynamic phases of the system. At low temperatures fluctuations of the magnetizations are negligible, so the susceptibility $\chi$ is small in the ferromagnetic phase. The connection between Potts spins and clusters of aligned spins has been established in the prior art.

Turning now to strongly inhomogeneous Potts models, this is the situation when the spins form magnetic "grains", with very strong couplings between neighbors that belong to the same grain, and very weak interactions between all other pairs. At low temperatures such a system is also ferromagnetic, but as the temperature is raised the system may exhibit an intermediate, super-paramagnetic phase. In this phase strongly coupled grains are aligned (i.e. are in their respective ferromagnetic phases), while there is no relative ordering of different grains.

It has been discovered in the present invention that at the transition temperature from the ferromagnetic to super-paramagnetic phase a pronounced peak of $\chi$ is observed. In the super-paramagnetic phase fluctuations of the state taken by grains acting as a whole (i.e. as giant super-spins) produce large fluctuations in the magnetization. As the temperature is further raised, the super-paramagnetic to paramagnetic transition is reached; each grain disorders and $\chi$ abruptly diminishes by a factor that is roughly the size of the largest cluster. Thus, the temperatures where a peak of the susceptibility occurs and the temperatures at which $\chi$ decreases abruptly indicate the range of temperatures in which the system is in its super-paramagnetic phase.

It has been discovered that in principle one can have a sequence of several transitions in the super-paramagnetic phase: as the temperature is raised the system may break first into two clusters, each of which breaks into more (macroscopic) sub-clusters and so on. Such a hierarchical structure of the magnetic clusters reflects a hierarchical organization of the data into categories and sub-categories.

In the development of the present invention analytic insight was gained into the behavior of inhomogeneous Potts ferromagnets by calculating the properties of such a "granular" system with a macroscopic number of bonds for each spin. For such models mean field is exact, and according to the present invention it can be shown that in the paramagnetic phase the spin state at each site is independent of any other spin; i.e.

$$G_{ij} = \frac{1}{q}.$$

Also, according to the present invention, at the paramagnetic/super-paramagnetic transition the correlation between spins belonging to the same group jumps abruptly to $$\frac{q-1}{q}\left(\frac{q-2}{q-1}\right)^2 + \frac{1}{q} \simeq 1 - \frac{2}{q} + O\left(\frac{1}{q^2}\right)$$

while the correlation between spins belonging to different groups is unchanged. The ferromagnetic phase is characterized by strong correlations between all spins of the system:

$$G_{ij} > \frac{q-1}{q}\left(\frac{q-2}{q-1}\right)^2 + \frac{1}{q}.$$

This turned out to be an important consideration that contributed significantly to the present invention. In mean field, in the super-paramagnetic phase, two spins that belong to the same grain are strongly correlated, whereas for pairs that do not belong to the same grain the correlation $G_{ij}$ is small. An important discovery of this present invention is that this double-peaked distribution of the correlations is not an artifact of mean field and is used for an efficient and valid solution of the problem of data clustering regarding the data set.

As will be shown below, the data points of the data set under processing (the clustering problem) are used as sites of an inhomogeneous Potts ferromagnet. Presence of clusters in the data gives rise to magnetic grains of the kind described above in the corresponding Potts model. Working in the super-paramagnetic phase of the model the values of the pair correlation function of the Potts spins are used to decide whether a pair of spins do or do not belong to the same grain and these grains are identified as the clusters of the data set under processing.

The output of step $S_C$ is the input to step $S_D$ in which phase transition temperatures are identified and located. In the activity of step $S_D$, Monte Carlo simulations are performed for different temperatures using known prior art techniques, such as, Swendsen-Wang, Wolff or Multi-grid and using the Hamiltonian $\mathcal{H}$ (equation (1) which was determined in step $S_C$). Following the performance of the simulations, measure is taken of the magnetization, susceptibility $\chi_{(T)}$ or any other physical quantity (cluster sizes $N_{i(T)}$ number of active bonds, its variance, energy, specific heat) for each simulation performed. Then, the temperatures $T_i$ corresponding to phase transitions are identified, that is, those temperatures $T_i$ which relate to either a maxima or jump occurrence in the physical quantities mentioned above for which measure is taken. Implementation of the identification of temperatures $T_i$ is simple since it involves only determination or analysis of a single curve (e.g. $\chi_{(T)}$) or a small set of curves (e.g. $N_{i(T)}$).

More particularly, to evaluate sums such as equation (2) for (A), given above, equilibrium statistical mechanics is employed for models with $N>>1$ spins. Actually one is usually interested in the thermodynamic limit, e.g. when the number of spins $N \to \infty$. This can be done analytically only for very limited cases. One resorts therefore to various approximations (such as mean field), or to computer simulations that aim at evaluating thermal averages numerically.

Direct evaluation of sums like equation (2) for (A) above is impractical, since the number of configurations S increases exponentially with the system size N. Monte Carlo simulations methods overcome this problem by generating a characteristic subset of configurations which are used as a statistical sample. They are based on the notion of importance sampling, in which a set of spin configurations $\{S_1, S_2, \ldots S_M\}$ is generated according to the Boltzmann probability distribution $P_{(S)}$, see above, equation (3) for (A), equation (2) is reduced to a simple arithmetic average $$\langle A \rangle \approx \frac{1}{M} \sum_i^M A(s_i) \tag{7}$$

where the number of configurations in the sample, M, is much smaller than $q^N$, the total number of configurations. The set of M states necessary for the implementation of the modified (A) are constructed by means of a Markov process in the configuration space of the system. There are many ways to generate such a Markov chain, but according to the present invention it is essential to use the Swendsen-Wang Monte Carlo algorithm (SW), because it has been discovered that this algorithm is perfectly suitable for working in the super-paramagnetic phase; it overturns an aligned cluster in one Monte Carlo step, whereas other algorithms are woefully inefficient.

The first configuration can be chosen at random (or by setting all $s_i=1$). One can say that n configurations of the system, $\{S_i\}_{i=1}^n$, are already generated and one can start to generate configuration n+1. This is the way it is done.

First, "visit" all pairs of spins <i,j> that interact, i.e. have $J_{ij}>0$; the two spins are "frozen" together with probability $$p_{i,j}^f = 1 - \exp\left(-\frac{J_{ij}}{T} \delta_{s_i,s_j}\right), \tag{8}$$

That is, if in the current configuration $S_n$ the two spins are in the same state, $s_i=s_j$, then sites i and j are frozen with probability $p^f=1-\exp(-J_{ij}/T)$.

Having gone over all the interacting pairs, the next step of the algorithm is to identify the SW-clusters of spins. A SW-cluster contains all spins which have a path of frozen bonds connecting them. Note that according to the probability equation above only spins of the same value can be frozen in the same SW-cluster. After this step the N sites are assigned to some number of distinct SW-clusters. If one thinks of the N sites as vertices of a graph whose edges are the interactions between neighbors $J_{ij}>0$, each SW-cluster is a subgraph of vertices connected by frozen bonds.

The final step of the procedure is to generate the new spin configuration $S_{n+1}$. This is done by drawing, independently for each SW-cluster, randomly a value $s=1, \ldots q$, which is assigned to all its spins. This defines one Monte Carlo step $S_n = S_{n+1}$. By iterating this procedure M times while calculating at each Monte Carlo step the physical quantity $A(S_i)$ the thermodynamic average, is obtained. The physical quantities that are of interest in the present invention are the magnetization ms) and its square value for the calculation of the susceptibility $\chi$, and the spin—spin correlation function $G_{ij}$. Whereas in most simulations a number of the early configurations are discarded, to allow the system to "forget" its initial state, this is not necessary if the number of configurations M is not too small (increasing M improves of course the statistical accuracy of the Monte Carlo measurement). Measuring autocorrelation times in accordance with known prior art procedures provides a way of both deciding on the number of discarded configurations and for checking that the number of configurations M generated is sufficiently large. A less rigorous way is simply plotting the energy as a function of the number of SW steps and verifying that the energy reached a stable regime. At temperatures where large regions of correlated spins occur, the SW procedure is particularly efficacious because it flips large clusters of aligned spins simultaneously. Hence the SW method exhibits much smaller autocorrelation times than other methods, especially local methods.

The output of step $S_D$ is the input to Step $S_E$ where the clusters are constructed. In step $S_D$, the Potts model, the various thermodynamic functions that one measures for it and the (numerical) method used to measure these quantities have been established. In step $S_E$ the clustering of the data is effected. To this end, one can assume, for the sake of concreteness, that the data consists of N patterns or measurements $v_i$, specified by N corresponding vectors $\vec{x}_i$, embedded in a D-dimensional metric space. The method of the present invention consists of three stages. The starting point is the specification of the Hamiltonian $\mathcal{H}$, equation (1) which governs the system. Next, by measuring the susceptibility $\chi$ and magnetization as function of temperature the different phases of the model are identified. Finally, the correlation of neighboring pairs of spins, $G_{ij}$, is measured. This correlation function is then used to partition the spins and the corresponding data points into clusters.

The outline of stages $S_C$, $S_D$, and $S_E$ and the sub-tasks contained in each can be summarized as follows:

$S_C$ Construct the physical analog Potts-spin problem:
(a) Associate a Potts spin variable $s_i=1, 2, \ldots q$ to each point $v_i$.
(b) Identify the neighbors of each point $v_i$ according to a selected criterion.
(c) Calculate the Hamiltonian $\mathcal{H}$ and the interaction $J_{ij}$ between neighboring points $v_i$ and $v_j$.
$S_D$ Locate the super-paramagnetic phase.
(a) Estimate the (thermal) average magnetization, (m), for different temperatures.
(b) Use the susceptibility $\chi$ to identify the super-paramagnetic phase.
$S_E$ In the super-paramagnetic regime
(a) Measure the spin—spin correlation, $G_{ij}$, for all neighboring points $v_i$, $v_j$.
(b) Construct the data-clusters.

Following step $S_E$, a decision is taken in step $S_F$ regarding resolution, if acceptable, the data clusters are passed to step $S_G$ where they are displayed, such as, by creating a map, or are stored. If better resolution is desired, the output of step $S_F$ is the input to step $S_H$ where a "zooming" procedure is effected by recalculating $J_{ij}$ for each cluster and returning to step $S_C$ for processing through steps $S_C$, $S_D$ and $S_E$.

In the following is provided detailed descriptions of the manner in which each of those three stages are implemented.

Specify the Hamiltonian of the form of equation (1), choose the value of q, the number of possible states a Potts spin can take, define "neighbor" points and provide the functional dependence of the interaction strength $J_{ij}$ on the distance between neighboring spins.

The number of Potts states, q, determines mainly the sharpness of the transitions and the temperatures at which they occur. The higher q, the sharper the transition, but it is necessary to perform longer simulations as the value the q increases. It has been found, according to the present invention, that the influence of q on the resulting classification is weak. Therefore, q=20 in used all the examples presented, and this value of q is considered typical. Note that the value of q does not imply any assumption about the number of clusters present in the data.

The need for identification of the neighbors of a point $\vec{x}_i$ could be eliminated by letting all pairs i, j of Potts spins interact with each other, via a short range interaction $J_{ij}$=f ($d_{ij}$) which decays sufficiently fast (say, exponentially or faster) with the distance between the two data points. The phases and clustering properties of the model will not be affected strongly by the choice of f. Such a model has O ($N^2$) interactions, which makes its simulation rather expensive for large N. For the sake of computational convenience it was decided to keep only the interactions of a spin with a limited number of neighbors, and setting all other $J_{ij}$ to zero. Since the data do not form a regular lattice, one has to supply some reasonable definition for "neighbors". As it turns out, the results are quite insensitive to the particular definition used. There are several well known methods, e.g. Delaunay triangulation. This definition is used when the patterns are embedded in a low dimensional (D≦3) space.

For higher dimensions the mutual neighborhood value is used; in such circumstances $v_i$ and $v_j$ have a mutual neighborhood value K, if and only if $v_i$ is one of the K-nearest neighbors of $v_j$ and $v_j$ is one of the K-nearest neighbors of $v_i$. K is chosen such that the interactions connect all data points to one connected graph. The preferred K is (5≦K≦20). Clearly K grows with the dimensionality. It has been found convenient, in cases of very high dimensionality (D>100), to fix K=10 and to superimpose to the edges obtained with this criteria the edges corresponding to the minimal spanning tree associated with the data. Other known definitions are possible.

In order to have a model with the physical properties of a strongly inhomogeneous granular magnet, strong interaction is wanted between spins that correspond to data from a high-density region, and weak interactions between neighbors that are in low-density regions. To this end and in common with other "local methods", it is assumed that there is a 'local length scale' ~a, which is defined by the high density regions and is smaller than the typical distance between points in the low density regions. This a is the characteristic scale over which short-range interactions decay. There are various choices but best results were obtained using $$J_{ij} = \begin{cases} \frac{1}{\hat{K}} \exp\left(-\frac{d_{ij}^2}{2a^2}\right) & \text{if } v_i \text{ and } v_j \text{ are neighbors} \\ 0 & \text{otherwise} \end{cases} \quad (9)$$

The "local length scale" a was chosen to be the average of all distances $d_{ij}$ between neighboring pairs $v_i$ and $v_j$. $\hat{K}$ is the average number of neighbors; it is twice the number of non vanishing interactions divided by the number of points N. This careful normalization of the interaction strength enabled estimation of the temperature corresponding to the highest super-paramagnetic transition. It should be noted that everything done so far can be easily implemented in the case when instead of providing the $\vec{x}_i$ for all the data there is an N×N matrix of dissimilarities $d_{ij}$. The dissimilarities measure $d_{ij}$ is referred to in step $S_B$ regarding data representation.

In step $S_D$, the various temperature intervals in which the system self-organizes into different partitions to clusters are identified by measuring the susceptibility $\chi$ as a function of temperature. First, the Monte Carlo procedure is summarized and then an estimate of the highest transition temperature to the super-paramagnetic regime is provided. Starting from this estimate, one can take increasingly refined temperature scans and calculate the function $\chi(T)$ by Monte Carlo simulation. The Swendsen-Wang procedure described above is used; there follows a step by step summary of the procedure.

1. Choose the number of iterations M to be performed.
2. Generate the initial configuration by assigning a random value to each spin.
3. Assign frozen bond between nearest neighbors points $v_i$ and $v_j$ with probability $p_{i,j}^f$, equation (8).
4. Find the connected subgraphs, the SW-clusters.
5. Assign new random values to the spins (spins that belong to the same SW-cluster are assigned the same value).
6. Calculate the value assumed by the physical quantities of interest in the new spin configuration.
7. Go to step 3, unless the maximal number of iterations M, was reached.
8. Calculate the averages, equation (7).

The super-paramagnetic phase can contain many different sub-phases with different ordering properties. A typical example can be generated by data with a hierarchical structure, giving rise to different acceptable partitions of the data. The susceptibility $\chi$ is measured at different temperatures in order to locate these different regimes. The aim is to identify the temperatures at which the system changes its structure.

As previously discussed, the super-paramagnetic phase is characterized by a non-vanishing susceptibility. Moreover, there are two basic features of x of interest. The first is a peak in the susceptibility, which signals a ferromagnetic to super-paramagnetic transition, at which a large cluster breaks into a few smaller (but still macroscopic) clusters. The second feature is an abrupt decrease of the susceptibility, corresponding to a super-paramagnetic to paramagnetic transition, in which one or more large clusters have melted (i.e. broke up into many small clusters).

The location of the super-paramagnetic to paramagnetic transition which occurs at the highest temperature can be roughly estimated by the following considerations. First approximate the clusters by an ordered lattice of coordination number $\hat{K}$ and a constant interaction $$J \approx \langle\langle J_{ij} \rangle\rangle = \left\langle\!\!\left\langle \frac{1}{\hat{K}} \exp\left(-\frac{d_{ij}^2}{2a^2}\right) \right\rangle\!\!\right\rangle \approx \frac{1}{\hat{K}} \exp\left(-\frac{\langle\langle d_{ij}^2 \rangle\rangle}{2a^2}\right)$$

where $\langle\langle \ldots \rangle\rangle$ denotes the average over all neighbors. Secondly, from the Potts model on a square lattice this transition should occur roughly at $$T \approx \frac{1}{4\log(1+\sqrt{q'})} \exp\left(-\frac{\langle\langle d_{ij}^2 \rangle\rangle}{2a^2}\right). \quad (10)$$

An estimate based on the mean field model yields a very similar value.

Once the super-paramagnetic phase and its different sub-phases have been identified, one temperature in each region of interest is selected. The rationale is that each sub-phase characterizes a particular type of partition of the data, with new clusters merging or breaking. On the other hand, as the temperature is varied within a phase, one expects only shrinking or expansion of the existing clusters, changing only the classification of the points on the boundaries of the clusters.

Next, in step $S_E$, the spin—spin correlation function $G_{ij}$, between neighboring sites $v_i$ and $v_j$, is used to build the data clusters. In principle calculate the thermal average, equation (7) of $\delta_{s_i,sj}$ in order to obtain $G_{ij}$. However, the Swendsen-Wang method provides an improved estimator of the spin—spin correlation function. One calculates the two-point connectedness $C_{ij}$, the probability that sites $v_i$ and $v_j$ belong to the same SW-cluster, which is estimated by the average, equation (7) of the following indicator function $$c_{ij} = \begin{cases} 1 & \text{if } v_i \text{ and } v_j \text{ belong to the same SW-cluster} \\ 0 & \text{otherwise} \end{cases}$$

$C_{ij} = \langle c_{ij} \rangle$ is the probability of finding sites $v_i$ and $v_j$ in the same SW-cluster. Then the relation $$G_{ij} = \frac{(q-1)C_{ij}+1}{q}; \quad (11)$$

is used to obtain the correlation function $G_{ij}$.

Clusters are identified by the following:

1. At each $T_i$ calculate the spin—spin correlations $G_{ij}$, note that the thermal average of $\delta_{s_i,sj}$ is called the spin—spin correlation function.
2. Build the clusters' "core" using a thresholding procedure; if $G_{ij}$ is bigger than a prechosen threshold $\theta$, a link is set between the neighbor data points $v_i$ and $v_j$. The preferred threshold $\theta$ is in the range 0.2–0.8. The resulting connected graphs are those cores.
3. Linking each point $v_i$ to its neighbor $v_j$ of maximal correlation $G_{ij}$.
4. Data clusters are identified as the linked components of the graphs obtained as above.

The method of the present invention has been successfully tested on a variety of data sets. In the first example a data set was processed consisting of 4800 points in D=2 dimensions whose angular distribution is uniform and whose radial distribution is normal with variance 0.25;

$$\theta \sim U[0,2\pi]$$

$$\tau \sim N[R, 0.25],$$

half the points being generated with R=3, one third with R=2 and one sixth with R=1.

Since there is a small overlap between the clusters, the Bayes solution was considered as the optimal result; i.e. points whose distance to the origin is bigger than 2.5 are considered a cluster, points whose radial coordinate lies between 1.5 and 2.5 are assigned to a second cluster and the remaining points define the third cluster. These optimal clusters consist of 2393, 1602 and 805 points respectively. By applying the method of the present invention, and choosing the neighbors according to the mutual neighborhood criterion with K=10 the susceptibility as a function of the temperature was obtained as presented in FIG. 3($a$). The estimated temperature, equation (10) corresponding to the super-paramagnetic to paramagnetic transition is 0.075, which is in a good agreement with the one inferred from FIG. 3($a$).

FIG. 2 presents the clusters obtained at T=0.05. The sizes of the three largest clusters are 2358, 1573 and 779 including 98% of the data; the classification of all these points coincides with that of the optimal Bayes classifier. The remaining 90 points are distributed among 43 clusters of size smaller than 4. As can be noted in FIG. 2, the small clusters (less than 4 points) are located at the boundaries between the main clusters.

It is instructive to observe the behavior of the size of the clusters as a function of the temperature, presented in FIG. 3($b$). At low temperatures, as expected, all data points form only one cluster. At the ferromagnetic to super-paramagnetic transition temperature, indicated by a peak in the susceptibility, this cluster splits into three. These essentially remain stable in their composition until the super-paramagnetic to paramagnetic transition temperature is reached, expressed in a sudden decrease of the susceptibility $\chi$, where the clusters melt. Concerning the effect of the parameters on the procedure, the number of Potts states q affects the sharpness of the transition but the obtained classification is almost the same. For instance, choosing q=5 it was found that the three largest clusters contained 2349, 1569 and 774 data points, while taking q=200 yielded 2354, 1578 and 782 data points.

In a second example, intended to show the robustness of the inventive method and to give an idea of the influence of the dimension of the data on its performance, N D-dimensional points were generated whose density distribution is a mixture of two isotropic Gaussians, i.e.

$$\mathcal{P}_{(x)} = \frac{(\sqrt{2\pi}\,\sigma)^{-D}}{2}\left[\exp\left(-\frac{\|\vec{x}-\vec{y}_1\|^2}{2\sigma^2}\right) + \exp\left(-\frac{\|\vec{x}-\vec{y}_2\|^2}{2\sigma^2}\right)\right]$$

when $\vec{y}_1$ and $\vec{y}_2$ are the centers of the Gaussians and $\sigma$ determines its width. Since the two characteristics lengths involved are $\|\vec{y}_1-\vec{y}_2\|$ and $\sigma$, the relevant parameter of this example is the normalized distance $$L = \frac{\|\vec{y}_1-\vec{y}_2\|}{\sigma}.$$

The goal of this example is to find the minimal distance, $L_c$, at which the method is able to recognize that two clusters are present in the data, as a function of the dimension D and number of samples N. Note that the lower bound for the minimal discriminant distance for any non-parametric algorithm is 2 (for any dimension D). Below this distance the distribution is no longer bimodal, i.e. the maximal density of points is not longer located at the center of each Gaussian, but rather is at the middle point between them. Sets of N=1000, 2000, 4000 and 8000 samples and space dimensions D=2, 10, 100, 100 and 1000 were tested. We set the number of neighbors K=10 and superimposed the minimal spanning tree to ensure that at T=0 all points belong to the same cluster. Surprisingly it was observed that in the range $1000 \leq N \leq 8000$ the critical distance seems to depend only weakly on the number of samples, N. The second remarkable result is that the critical discriminant distance $L_c$ grows very slowly with the dimensionality of the data points, D. Apparently the minimal discriminant distance $L_c$ increases like the logarithm of the number of dimension D;

$$L_c = \alpha + \beta \log D \qquad (12)$$

where $\alpha$ and $\beta$ do not depend on D. The best fit in the range $2 \leq D \leq 1000$, yields $\alpha=2.3\pm0.3$ and $\beta=1.3\pm0.2$. Thus, this example suggests that the dimensionality of the points does not affect the performance of the method significantly.

The third example concerns the time-honored Anderson-Fisher Iris data, which has become a popular benchmark problem for clustering procedures. It consists of measurement of four quantities, performed on each of 150 flowers. The specimens were chosen from three species of Iris. The data constitute 150 points in four-dimensional space.

The purpose of this experiment is to present a slightly more complicated scenario. From the projection on the plane spanned by the first two principal components, presented on FIG. 4, one can observe that there is a well separated cluster (corresponding to the Iris Setosa species) while clusters corresponding to the Iris Virginia and Iris Versicolor do overlap.

Neighbors in the D=4 dimensional space were determined according to the mutual K (K=5) nearest neighbors definition; the inventive method was applied and the susceptibility curve of FIG. 5(a) was obtained, clearly showing two peaks. When heated, the system first breaks into two clusters at T≈0.01. At $T_{clus}$=0.02 we obtain two clusters, of sizes 80 and 40; points of the smaller cluster correspond to the species Iris Setosa. At T≈0.06 another transition occurs, where the larger cluster splits to two. At $T_{clus}$=0.07 three large clusters were identified, of sizes 45, 40 and 38, corresponding to the species Iris Versicolor, Virginica and Setosa respectively.

In the fourth example, the data set selected was the landsat example given previously.

The susceptibility curve FIG. 6(a) reveals four transitions, that reflect the presence of the following hierarchy of clusters (see FIG. 7). At the lowest temperature two clusters A and B appear. Cluster A splits at the second transition into $A_1$ and $A_2$. At the next transition cluster $A_1$ splits into $A_1^1$ and $A_1^2$. At last transition cluster $A_2$ splits into four clusters $A_2^i$, i=1 ... 4. At this temperature the clusters $A_2$ and B are no longer identifiable; their spins are in a disordered state, since the density of points in $A_2$ and B is significantly smaller than within the $A_1^i$ clusters. Thus, the superparamagnetic method overcomes the difficulty of dealing with clusters of different densities by analyzing the data at several temperatures.

This hierarchy indeed reflects the structure of the data. Clusters obtained in the range of temperature 0.08 to 0.12 coincides with the picture obtained by projection pursuit; cluster B corresponds to cotton crop terrain class, $A_1$ to red soil and the remaining four terrain classes are grouped in the cluster $A_2$. The clusters $A_1^1$ and $A_1^2$ are a partition of the red soil, while $A_2^1$, $A_2^2$, $A_2^3$ and $A_2^4$ correspond, respectively, to the classes grey soil, very damp grey soil, damp grey soil and soil with vegetation stubble. 97% purity was obtained, meaning that points belonging to different categories were almost never assigned to the same cluster.

The fifth example concerns isolated-letter speech recognition, namely, the "name" of a single letter pronounced by a speaker. The resulting audio signal is recorded for all letters of the English alphabet for many speakers. The task is to find the structure of the data, which is expected to be a hierarchy reflecting the similarity that exists between different groups of letters, such as {B, D} or {M, N} which differ only in a single articulatory feature. This analysis could be useful, for instance, to determine to what extent the chosen features succeed in differentiating the spoken letters.

The ISOLET database of 7797 examples created by Ron Cole which is available at the UCI machine learning repository was used as the fifth example. The data was recorded from 150 speakers balanced for sex and representing many different accents and English dialects. Each speaker pronounce each of the 26 letters twice (there are 3 examples missing). Cole's group has developed a set of 617 features describing each example. All attributes are continuous and scaled into the range −1 to 1. The features include spectral coefficients, contour features, sonorant, pre-sonorant, and post-sonorant features. The order of appearance of the features is not known.

Neighbors were determined setting the mutual neighborhood value K=30, and the inventive method was applied. The susceptibility curve obtained shown in FIG. 8(a) and the cluster size versus temperature curve presented in FIG. 8(b). The resulting partitioning obtained at different temperatures can be cast in hierarchical form, as presented in FIG. 9.

The present invention provides a novel, unique and efficient method and apparatus for non-parametric clustering, based on a physical, magnetic analogy. The mapping onto the magnetic problem is very simple; a Potts spin is assigned to each data point, and short-range ferromagnetic interactions between spins are introduced. The strength of these interactions decreases with distance. The thermodynamic system defined in this way presents different self organizing regimes and the parameter which determines the behavior of the system is the temperature. As the temperature is varied the system undergoes many phase transitions. The idea is that each phase reflects a particular data structure related to a particular length scale of the problem. Basically, the clustering obtained at one temperature that belongs to a specific phase should not differ substantially from the partition obtained at another temperature in the same phase. On the other hand, the clustering obtained at two temperatures corresponding to different phases must be significantly different, reflecting different organization of the data. These ordering properties are reflected in the susceptibility $\chi$ and the spin—spin correlation function $G_{ij}$. The susceptibility turns out to be very useful for signaling the transition between different phases of the system. The correlation function $G_{ij}$ is used as a similarity index, whose value is not determined only by the distance between sites $v_i$ and $v_j$, but also by the density of points near and between these sites. Separation of the spin—spin correlations $G_{ij}$ into strong and weak, as evident in description, reflects the existence of two categories of collective behavior. In contrast, the frequency distribution of distances $d_{ij}$ between neighboring points does not even hint that a natural cut-off distance, which separates neighboring points into two categories, exists. Since the double peaked shape of the correlations' distribution persists at all relevant temperatures, the separation into strong and weak correlations is a robust property of the proposed Potts model.

The novel method of the invention is stochastic, since a Monte Carlo procedure is used to "measure" the different properties of the system, but it is completely insensitive to initial conditions. Moreover, the cluster distribution as a function of the temperature is determined.

The method of the present invention is robust in the presence of noise, and is able to recover the hierarchical structure of the data without enforcing the presence of clusters. Also, the method of the present invention has been confirmed to be successful in real life situations, where prior existing methods would fail to overcome the difficulties posed by the existence of different density distributions and many characteristic lengths in the data.

Although the present invention has been shown and described with reference to preferred embodiments and best modes for carrying out the invention, changes and modifications may be apparent to those skilled in the art, which do not depart from the teachings herein. Such are deemed to fall within the purview of the invention as claimed herein.

What is claimed is:

1. A method for analyzing signals containing a data set which is representative of a plurality of physical phenomena, to identify and distinguish among said physical phenomena by determining clusters of data points within said data set, said method comprising:
    (1) constructing a physical analog Potts-spin model of the data set by
        (a) associating a Potts-spin variable $s_i=1, 2 \ldots q$ to each data point $v_i$,
        (b) identifying neighbors of each point $v_i$ according to a selected criterion,
        (c) determining the Hamiltonian 'H and determining the interaction $J_{ij}$ between neighboring points $v_i$ and $v_j$,
    (2) locating a super-paramagnetic phase of the data set using the Monte Carlo procedure to determine susceptibility $\chi(T)$ by
        (a) determining the thermal average magnetization (m) for different temperatures,
        (b) identifying the presence of a super-paramagnetic phase using susceptibility $\chi$,
    (3) determining the spin—spin correlation $G_{ij}$ for all neighboring points $v_i$ and $v_j$,
    (4) constructing data clusters using the spin—spin correlation $G_{ij}$ within the super-paramagnetic phase located in step (2) to partition the data set, and
    (5) identifying said physical phenomena based on said data clusters.

2. The method of claim 1 wherein the Monte Carlo procedure is carried out using the Swendsen-Wang technique.

3. The method of claim 1 including the further step of displaying the partitioned data set.

4. The method of claim 1 including the further step of recording the partitioned data set in a recording medium.

5. The method according to claim 1 wherein said data set comprises data which are representative of at least one of the group consisting of objects, patterns, characters, sounds, images, processes and signals representative thereof.

6. Apparatus for analyzing signals containing a data set which is representative of a plurality of physical phenomena, to identify and distinguish among said physical phenomena by determining clusters of data points within said data set, said apparatus comprising:
    (1) means for constructing a physical analog Potts-spin model of the data set including
        (a) means for associating a Potts-spin variable $s_i=1, 2 \ldots q$ to each data point $v_i$,
        (b) means for identifying neighbors of each point $v_i$ according to a selected criterion,
        (c) means for determining the Hamiltonian 'H and determining the interaction $J_{ij}$ between neighboring points $v_i$ and $v_j$,
    (2) means for locating a super-paramagnetic phase of the data set using the Monte Carlo procedure to determine susceptibility $\chi(T)$ including:
        (a) means for determining the thermal average magnetization (m) for different temperatures,
        (b) means for identifying the presence of a super-paramagnetic phase using susceptibility, $\chi$,
    (3) means for determining the spin—spin correlation $G_{ij}$ for all neighboring points $v_i$ and $v_j$,
    (4) means for constructing data using the spin—spin correlation $G_{ij}$ within the located super-paramagnetic phase to partition the data set, and
    (5) means for identifying said physical phenomena based on said data clusters.

7. The apparatus of claim 1 wherein the Monte Carlo procedure is carried out using the Swendsen-Wang technique.

8. The apparatus of claim 6 including means for digitally storing the partitioned data set as clusters of data.

9. The apparatus of claim 6 including means for displaying the partitioned data set.

10. The apparatus of claim 6 including means for recording the partitioned data set in a recording medium.

11. The apparatus of claim 10 including means for printing the partitioned data set on a print receiving medium.

12. Apparatus according to claim 6 wherein said data set comprises data which are representative of at least one of the group consisting of objects, patterns, characters, sounds, images, processes and signals representative thereof.

13. A method for recognizing a plurality of physical objects or phenomena represented collectively by a data set which comprises data points defined by a plurality of parametric values, by sorting said data points into clusters of data points, comprising:
    (1) constructing a physical analog Potts-spin model of the data set by
        (a) associating a Potts-spin variable $s_i=1, 2 \ldots q$ to each data point $v_i$,
        (b) identifying neighbors of each point $v_i$ according to a selected criterion,
        (c) determining the Hamiltonian H and determining the interaction $J_{ij}$ between neighboring points $v_i$ and $v_j$, (2) locating a super-paramagnetic phase of the data set using the Monte Carlo procedure to determine susceptibility $\chi(T)$ by
  (a) determining the thermal average magnetization (m) for different temperatures,
  (b) identifying the presence of a super-paramagnetic phase using susceptibility $\chi$,
(3) determining the spin—spin correlation $G_{ij}$ for all neighboring points $v_i$ and $v_j$,
(4) constructing data clusters using the spin—spin correction $G_{ij}$ within the super-paramagnetic phase located in step (2) to partition the data set; and
(5) identifying said physical phenomena based on said data clusters.

14. The method according to claim 13 wherein said data set comprises data which are representative of at least one of the group consisting of objects, patterns, characters, sounds, images, processes and signals representative thereof.

15. An apparatus for recognizing a plurality of physical objects or phenomena represented collectively by a data set which comprises data points defined by a plurality of parametric values, by sorting said data points into clusters of data points, said apparatus comprising:

(1) means for constructing a physical analog Potts-spin model of the data set by
  (a) associating a Potts-spin variable $s_i=1, 2 \ldots q$ to each data point $v_j$,
  (b) identifying neighbors of each point $v_i$ according to a selected criterion,
  (c) determining the Hamiltonian H and determining the interaction $J_{ij}$, between neighboring points $v_i$ and $v_j$,
(2) means for locating a super-paramagnetic phase of the data set using the Monte Carlo procedure to determine susceptibility C(T) by
  (a) determining the thermal average magnetization (m) for different temperatures,
  (b) identifying the presence of a super-paramagnetic phase using susceptibility $\chi$,
(3) means for determining the spin—spin correlation $G_{ij}$ for all neighboring points $v_i$ and $v_j$,
(4) means for constructing data clusters using the spin—spin correction $G_{ij}$ within the super-paramagnetic phase located in step (2) to partition the data set; and
(5) means for identifying said physical phenomena based on said data clusters.

16. Apparatus according to claim 15 wherein said data set comprises data which are representative of at least one of the group consisting of objects, patterns, characters, sounds, images, processes and signals representative thereof.

* * * * *